United States Patent [19]

Dugliss

[11] Patent Number: 4,678,608
[45] Date of Patent: Jul. 7, 1987

[54] CHEMILUMINESCENT COMPOSITION

[75] Inventor: Charles H. Dugliss, Westchester, N.Y.

[73] Assignee: American Cyanamid Company, Stamford, Conn.

[21] Appl. No.: 723,590

[22] Filed: Apr. 15, 1985

[51] Int. Cl.⁴ .................. C09K 11/00; A01K 97/12
[52] U.S. Cl. .......................................... 252/700; 43/16
[58] Field of Search ............... 252/700; 73/293; 116/26, 23; 43/16, 4

[56] References Cited

U.S. PATENT DOCUMENTS

| | | | |
|---|---|---|---|
| 3,749,679 | 7/1973 | Rauhut | 252/700 |
| 3,816,326 | 6/1974 | Bollyky | 252/700 |
| 3,948,797 | 4/1976 | Vega | 252/700 |
| 3,974,368 | 8/1976 | Rauhut | 252/700 X |
| 3,994,820 | 11/1976 | Maulding et al. | 252/700 |
| 4,002,591 | 1/1977 | Gangneux | 524/720 X |
| 4,089,836 | 5/1978 | Gangneux | 524/90 |
| 4,191,680 | 3/1980 | Wegmann et al. | 524/556 X |
| 4,372,745 | 2/1983 | Mandle et al. | 252/700 X |
| 4,379,320 | 4/1983 | Mohan et al. | 252/700 |

*Primary Examiner*—John F. Terapane
*Assistant Examiner*—Catherine S. Kilby
*Attorney, Agent, or Firm*—Frank M. Van Riet; Henry C. Jeanette

[57] ABSTRACT

Compositions intended to be reacted with hydrogen peroxide to produce chemiluminescent light are disclosed wherein the compositions contain an oxalate, a fluorescer and a soluble perylene dye.

16 Claims, No Drawings

CHEMILUMINESCENT COMPOSITION

BACKGROUND OF THE INVENTION

The production of chemiluminescent light by the reaction of a catalyzed hydrogen peroxide solution with a fluorescer solution is well known in the art. Blue, green and yellow chemiluminescent light has been produced depending upon the particular fluorescer employed in the fluorescer solution. Examples of these prior art chemiluminescent light-systems can be found in one or more of the following U.S. Pat. Nos. 3749679; 3391068; 3391069; 3974368; 3557233; 3597362; 3775336; 3888786.

One of the problems attendant the chemiluminescent light devices or systems of the prior art is that, in the dark, the commercially available systems fail to distinguish most colors when utilized as a light source. That is to say, when the chemiluminescent device or system is activated and used in the dark to identify objects, read road maps etc., the color of the object being identified or map being read is often distorted. The true color of the object being observed with the chemiluminescent light appears as a color different from its normal color in the daylight. As a result, errors in judgment or transmission of information can result.

A further disadvantage of some commercially available chemiluminescent light devices or systems in their failure to reach a light intensity required for particular uses or applications.

Accordingly, if a chemiluminescent system could be developed which exhibits white light upon activation or which exhibits a higher light intensity upon activation, a long felt need would be satisfied.

SUMMARY OF THE INVENTION

Chemiluminescent compositions have now been developed which, when activated in the presence of hydrogen peroxide and a solvent, either exhibit white light in the dark, which white light enables one to discern colors accurately, or exhibit colored light at an intensity greater than those systems now commercially available.

DESCRIPTION OF THE INVENTION INCLUDING PREFERRED EMBODIMENTS

The present invention is directed to compositions which are intended to be reacted with or activated by hydrogen peroxide in the presence of an organic solvent which composition comprises an oxalate, a fluorescer and a soluble perylene dye, each in sufficient quantity to result in visible chemiluminescent light.

The ability of the above compositions to exhibit white light in the dark or exhibit colored light of a greater intensity is due to the presence of the soluble perylene dye. The soluble perylene dye when added, for example, to a chemiluminescent composition containing a blue fluorescer, results in a white light instead of a blue light, however various hues between blue and white and white and peach can be obtained by varying the amount of soluble perylene dye employed. The amount of soluble perylene dye employed in the compositions of the present invention therefore can range between $5 \times 10^{-4}$ to $5 \times 10^{-3}$, by weight, based on the total weight of the composition, preferably $1.1 \times 10^{-3}$ to $2.6 \times 10^{-3}\%$. At the lower ratios, the color obtained ranges from violet to pink; at intermediate ratios a white light with either a faint blue cast or pink cast results and at higher ratios various hues of orchid and peach form.

The mole ratio of the soluble perylene dye to the specific fluorescer employed should range from about $3.45 \times 10^{-3}$ to $8.15 \times 10^{-3}$ to 1.

The concentrations of the oxalate and fluorescer in the compositions of the present invention are as discloed in the art and, in particular, as disclosed in U.S. Pat. No. 374679, hereby incorporated herein by reference. Any oxalate and/or fluorescer known to be useful in the production of chemiluminescent systems or devices can be used herein. Preferred fluorescers include 9,10-diphenylanthracene, 1-chloro-9,10-bis(phenyethynyl)anthracene and 9,10-bis(phenylethynyl)anthracene while preferred oxalates include bis(2,4,5-trichloro-6-carbopentoxyphenyl)oxalate, each in sufficient known quantity to result in visible chemiluminescent light mixtures of fluorescers may also be used.

Useful catalysts include those disclosed in U.S. Pat. No. 3775336, hereby incorporated herein by reference, in the concentrations disclosed therein. A preferred catalyst is sodium salicylate.

The organic solvents useful herein include those known in the art and disclosed in the above-referenced U.S. patents. Preferred are esters, aromatic hydrocarbons and chlorinated hydrocarbons. Most preferred are dialkylphthalates wherein the alkyl group contains 1-12 carbon atoms, inclusive. Dibutyl phthalate is exemplary.

Any perylene dye which is soluble in the solvent solution used to produce the composition of the present invention may be used therein. Suitable perylene dyes include N,N'-bis(2,5-di-t-butylphenyl)-3,4,9,10-perylenedicarboximide. This red fluorescent dye has the structural formula:

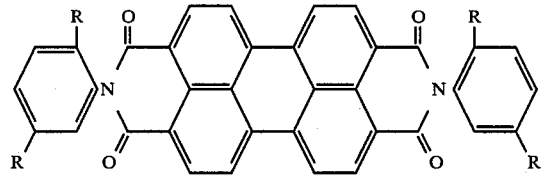

wherein each R is a t-butyl radical.

The novel compositions of the present invention may be prepared by any of three different methods. First, a concentrate of the perylene dye in the fluorescer-oxalate system is made and an aliquot of this solution is added to a standard fluorescer-oxalate system to obtain the desired mole ratio of perylene dye to fluorescer. Second, the required amount of perylene dye is dissolved in the fluorescer-oxalate system to obtain ab initio the desired ratio of perylene dye to fluorescer. Third, the required amount of perylene dye is dissolved in the solvent and the final composition is made by adding fluorescer and oxalate as required.

Chemiluminescent devices can be easily prepared utilizing known device components by adding the compositions of the present invention to e.g. a polyethylene tube. A sealed vial containing the solvent solution of catalyst and hydrogen perioxide is then placed in the oxalate solution in the tube which is then sealed. Chemiluminescence occurs when the tube is bent, the vial is broken and the mixture is shaken, by activation of the instant composition by the catalyst solution.

As explained above, the compositions of the present invention enable the production of cold, white chemiluminescent light. Prior systems enabled the creation of only blue, green and yellow light.

The compositions of the present invention are useful where white light is required, such as dark areas to read road maps, signs and directions or where no electrical power exists. They are useful under water, as fishing lures, signals, and in scuba diving when used to form activatable devices.

The following examples are set forth for purposes of illustration only and are not to be construed as limitations on the present invention except as set forth in the appended claims. All parts and percentages are by weight unless otherwise specified.

EXAMPLE 1

A. To a suitable vessel are added 91.3 parts of dibutyl phthalate which is heated to 150° C. and purged with nitrogen gas. 8.6 Parts of bis(2,4,5-trichloro-6-carbopentoxyphenyl)oxalate are then added, with stirring, until the oxalate is dissolved. To the resultant solution is then added 0.13 part of 9,10-diphenylanthracene (blue fluorescer) and 0.0013 part of N,N'-bis(2,5-di-tert-butylphenyl)-3,4,9,10-perylene dicarboximide. Stirring is continued until the dicarboximide is completely in solution. The resultant solution is called Solution A.

B. To a second vessel are added 81.45 parts of dimethylphthalate and 13.32 parts of t-butyl alcohol. To this mixture are added 5.23 parts of 90% hydrogen peroxide and 0.0091 part of sodium salicylate. The resultant solution is called Solution B.

To three parts by volume of Solution A is added 1 part by volume of Solution B. The result is the generation of a white chemiluminescent light. In a dark room, the light generated is sufficient to enable one to discern the colors red, blue, green and yellow on a standard road map.

EXAMPLE 2

When the procedure of Example 1 is followed except that the amount of dicarboximide was 0.005 part, the resultant chemiluminescent color is peach in the dark. Exact colors can be discerned utilizing the reaction product as a light source.

EXAMPLE 3

The procedure of Example 1A is again followed except that Solution A contains 88.6 parts of dibutyl phthalate and 11.11 parts of the oxalate. The 9,10-diphenylanthracene is replaced by yellow fluorescer (0.26 part) 1-chloro-9,10-bis(phenylethynyl)anthracene. The resultant solution is called Solution C.

When one part by volume of Solution B is added to 3 parts by volume of Solution C, the resultant yellow chemiluminescent light is much brighter than when the perylenedicarboximide is omitted.

EXAMPLE 4

A solution, hereinafter called Solution D, is prepared as in Example 1A, except that 92.85 parts of dibutyl phthalate and 7.04 parts of oxalate are used. The 9,10-diphenylanthracene is replaced by 0.11 part of 9,10-bis(phenylethynyl)anthracene (green fluorescer). The perylene-dicarboximide concentration is 0.005 part.

When Solution B is added to Solution D (1:3), the resultant chemiluminescent light is white.

EXAMPLE 5

Use of 0.0024 parts of perylene-dicarboxyimide in place of the amount employed in Example 4 results in the formation of a yellowish green chemiluminescent light.

EXAMPLE 6–8 (Comparative)

When the procedure of Example 2 is again followed except that the soluble perylenedicarboximide is replaced by the following commercially available insoluble perylene dyes (6) Red BPT, (7) Perrindo Red and (8) Indo Vat Brilliant Scarlet R, no color change or brightening effect is observed, thereby evidencing the need for a soluble dye.

EXAMPLE 9

The procedure of Example 1 is again followed except that the fluorescer is a mixture of 9,10-diphenylanthracene and 1-chloro-9,10-bis(phenylethynyl)anthracene. The result white ligh emits over the entire 480–540 wavelength, a feature not possessed by the blue, yellow or green chemiluminescent light of the prior art.

What is claimed:

1. A composition intended to be reacted with hydrogen peroxide in the presence of an organic solvent to produce visible chemiluminescent light comprising a solvent solution of (1) an oxalate, (2) a fluorescer and (3) from about $5 \times 10^{-4}$ to $5 \times 10^{-3}$ percent, by weight, based on the total weight of the composition, of a soluble perylenedicarboximide dye, the mole ratio of said perylenedicarboximide dye to said fluorescer ranging from about $3.45 \times 10^{-3}$ to $8.15 \times 10^{-1}$ to 1.

2. A composition according to claim 1 wherein the perylene dye is N,N'-bis(2,5-di-t-butylphenyl)-3,4,9,10-perylenedicarboximide.

3. A composition according to claim 1 wherein said fluorescer is 9,10-diphenylanthracene.

4. A composition according to claim 1 wherein said oxalate is bis(2,4,5-trichloro-6-carboalkoxyphenyl)oxalate.

5. A composition according to claim 1 wherein said solvent is an ester, an aromatic hydrocarbon or a chlorinated hydrocarbon.

6. A composition according to claim 5 wherein said solvent is a dialkyl phthalate, the alkyl group containing from 1–12 carbon atoms, inclusive.

7. A method for producing a chemiluminescent light which comprises adding to the composition of claim 1 a solution of hydrogen peroxide and a basic catalyst.

8. A composition according to claim 1 wherein said fluorescer is 1-chloro-9,10-bis(phenylethynyl)anthracene.

9. A composition according to claim 1 wherein said fluorescer is a mixture of 9,10-diphenylanthracene and 1-chloro-9,10-bis(phenylethynyl)anthracene.

10. A composition, according to claim 1, wherein said fluorescer is 9,10-bis(phenylethynyl)anthracene.

11. A composition, according to claim 2, wherein said fluorescer is selected from the group consisting of: 9,10-diphenylanthracene; 1-chloro-9,10-bis(phenylethynyl)anthracene; a mixture of 9,10-diphenylanthracene and 1-chloro-9,10-bis(phenylethynyl)anthracene; and 9,10-bis(phenylethynyl)anthracene.

12. A composition, according to claim 11, wherein the oxalate is bis(2,4,5-trichloro-6-carboalkoxyphenyl)oxalate.

13. A composition, according to claim 11, wherein said fluorescer is 9,10-diphenylanthracene.

14. A composition, according to claim 11, wherein said fluorescer is 9,10-bis(phenylethynyl)anthracene.

15. A composition, according to claim 11, wherein said fluorescer is a mixture of 9,10-diphenylanthracene and 1-chloro-9,10-bis(phenylethynyl)anthracene.

16. A composition, according to claim 11, wherein said fluorescer is 1-chloro-9,10-bis(phenylethynyl)anthracene.

* * * * *

UNITED STATES PATENT AND TRADEMARK OFFICE
CERTIFICATE OF CORRECTION

PATENT NO. : 4,678,608
DATED : July 7, 1987
INVENTOR(S) : Charles H. Dugliss

It is certified that error appears in the above-indentified patent and that said Letters Patent is hereby corrected as shown below:

In Column 4, Line 26 in Claim 1:
  replace "from about $3.45 \times 10^{-3}$ to $8.15 \times 10^{-1}$ to 1."

with:
  --from about $3.45 \times 10^{-3}$ to $8.15 \times 10^{-3}$ to 1.--

Signed and Sealed this

Fifteenth Day of October, 1996

Attest:

BRUCE LEHMAN

Attesting Officer        Commissioner of Patents and Trademarks